United States Patent Office 2,732,154
Patented Jan. 24, 1956

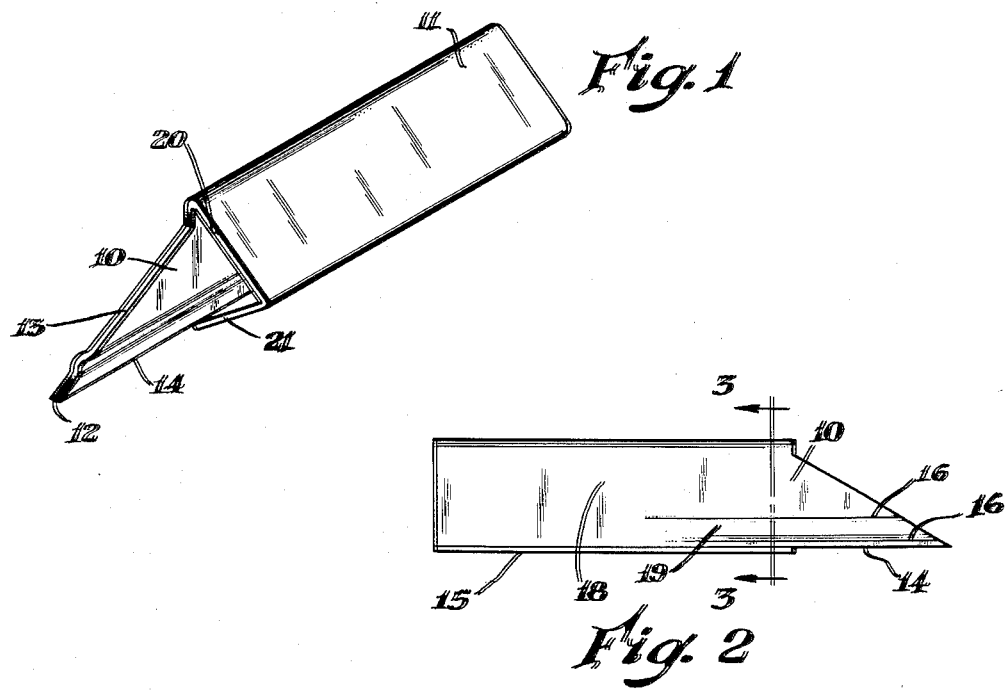
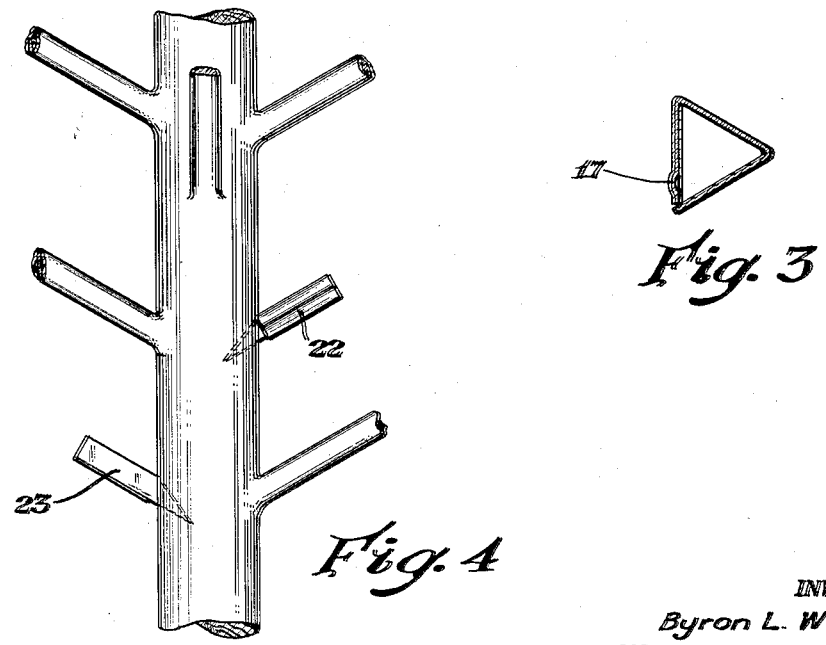
INVENTOR.
Byron L. Wilson
BY
Dean Lawrence
ATTORNEY

2,732,154

BRANCH HOLDER

Byron L. Wilson, Saginaw, Mich.

Application August 31, 1951, Serial No. 244,588

1 Claim. (Cl. 248—42)

The present invention relates to a holder for tree branches, flags and pennants, and is more particularly concerned with an improved Christmas tree branch holder.

Previously, various mechanical devices have been used to produce symmetrical Christmas trees by re-locating and securing additional branches or limbs in the appropriate places. One such device utilizes a wire having end members adapted to be wrapped around the main portion of the tree trunk adjacent to the point at which it is desired to secure the additional tree limb. Another apparatus utilizes a complicated two-piece jointed mechanism, one member of which is attached to the main trunk of the tree while the second member is adapted to hold the tree branch. Generally, the conventional holders are cumbersome to insert, especially into relatively hard wood, and frequently the user lacks the mechanical skill necessary to manipulate the device properly.

An object of the present invention is to provide a one-piece Christmas tree branch holder that is simple in structure and capable of being driven into the trunk of the tree by a person having little or no mechanical ability. Another object of the present invention is to provide an improved branch holder having a double wedge action which secures the branch tightly to the trunk without using wires or other additional means to prevent rocking or tilting of the holder or socket.

A still further object of the present invention is to provide a branch holder or socket that is capable of supporting objects other than Christmas tree branches, such as flags and pennants. An additional object is to provide a one-piece branch holder adapted to hold branches of varying diameters.

Other objects and purposes of the invention will be apparent to persons acquainted with apparatus of this general type upon reading the following disclosure and inspection of the accompanying drawings.

My invention comprises a one-piece structure having a tapered prong capable of penetrating the trunk of a tree and having a triangular resilient socket member adapted to receive tree branches of varying size and thickness.

In the annexed drawings:

Figure 1 represents a perspective view showing in solid lines the tapered shank or prong forming the penetration means and the triangular tubular member capable of holding and supporting the Christmas tree branch.

Figure 2 represents a side view showing the penetrating shank as a continuation of one side of the triangular socket member of the apparatus.

Figure 3 represents a section taken on the line 3—3 of Figure 2 showing in further detail the triangular shape of the socket member portion and the ridge thereon.

Figure 4 is a side elevational view showing my improved branch holder in proper position for supporting a branch or flag, and in which view the device indicated on the left side of the trunk is shown in substantially the same position as in Figure 2 and the device indicated on the right side of the trunk is shown in essentially the same position as illustrated in Figure 1.

In general, my invention is in a one-piece apparatus including a pointed, tapered shank member and a triangular tubular element adapted to receive the inner or butt-end portion of a severed branch, which apparatus may be used to impinge or penetrate a tree trunk or window sill or like object to which branches, flags, or pennants are to be attached. My device is so constructed that a double wedging or locking action of the holder or socket to the trunk is achieved. My invention is further characterized by the fact that, in use, the tapered shank element enters substantially perpendicular to the grain of the wood and not parallel to the grain as in the case of many of the prior art mechanisms.

Referring now to the drawings in detail:

Figure 1 shows a side perspective view of my improved branch holder in which the tapered shank member 10 and the triangular tubular resilient socket member 11 are illustrated. The shank member 10 is tapered to a sharp point 12, which construction facilitates insertion of the shank for impinging the device to the Christmas tree trunk. One edge 13 of the shank or flange is tapered to form an angle of approximately 30 to 45 degrees with the point 12 and the second side 14, whereas the second side 14 is maintained essentially parallel to the edge 15 of the triangular sleeve element of the mechanism as illustrated in Figure 2. The shaded lines 16 in Figure 2 and the bulge 17 in Figure 3 define the slight raised ridge 19 in the side 18 of the triangular socket as shown in Figure 2. This ridge 19 tends to reinforce the shank or flange member and enables the holder to be wedged more securely into the tree trunk. This raised ridge 19 extends across approximately one-half of the side 18 of the socket element and across the entire flange or shank element 10.

The double wedging or locking effect is achieved by, first, the impingement of the tree trunk with the tapered shank or flange 10 having the raised ridge 19 and by, second, the engagement of the socket member's terminal edges 20 and 21, as shown in Figure 1, with the trunk of the tree as the shank element of the device is "driven in" substantially against the grain of the wood. Thus, the double wedge action prevents the "drive ins," once attached, 22, 23, from rocking or tilting after the detached branch has been inserted into the triangularly shaped sleeve member.

In carrying out my invention for an improved Christmas tree "drivein," I can use about 18 or 20 gauge metal, 19 to 20 gauge steel being preferred. The device can be economically constructed from sheet metal with the use of a conventional punch press. Either flat stocks or single sheets may be pressed in a single operation, the final bending to the desired triangular shape subsequently being accomplished in a second operation. Alternatively, the "drive in" can be formed with a progressive die in which the steps of "blanking" or cutting out, indenting, partial forming to an approximate U-shape, and triangular forming to the desired triangular sleeve having the tapered prong can be successively carried out in a single operation. Other conventional means can also be employed to produce the device of the present invention. The improved branch holder is then readily pounded by the user into the Christmas tree trunk, and thus holds the additional or rearranged branches securely. Since the branches of most varieties of evergreens suitable for Christmas trees grow naturally at an elevated angle of approximately 10 to 15 degrees with respect to a line drawn perpendicular to the tree trunk, my limb securing device is forced into the trunk substantially "against" the grain of the wood, thereby suppressing any tendency to split or fracture the wood along its grain while at the same time achieving a greater wedging effect by the pressure of the spread grain against the shank member.

My triangular, tubular socket member is formed in such a manner as to have a slight opening immediately adjacent to one edge 15 and extending substantially parallel to the entire length of the side 18. Essentially, this opening is formed as a result of the incomplete closure of two sides of the tubular triangular sleeve member as illustrated in Figure 3. This opening feature provides a certain resiliency to my novel device so that branches of varying diameters can be forced into the socket member and can thus be securely bound in position.

It will be thus appreciated that I have provided a structure capable of accomplishing the various objects set forth and it will be recognized that various modifications may be made in the specific structural details appearing in the particular embodiment herein chosen for illustrative purposes, and said structural modifications will be included within the scope of the appended claim.

I claim:

A holding device adapted to impinge the trunk of a tree or post for securing a round shafted object thereto and for retarding the tendency of said round shafted object to rotate which includes: an elongate sleeve forming in cross section a substantially equilateral triangle with three planal surfaces and being split at the planal intersection of two of said surfaces; a prong extending from said sleeve and being a substantially planal extension of one of said surfaces forming an elongate right triangle, the point of said prong being positioned on the edge of one of said surfaces and at the intersection of the hypotenuse of the right triangle, the hypotenuse intersecting with the terminal edge of an adjacent of said surfaces to form the small base of the right triangle; and a ridge upset in the planal side extending to form said prong, running substantially a part of the length of said prong side and extending substantially the length of said prong and offset from the point thereof.

References Cited in the file of this patent

UNITED STATES PATENTS

| 1,136,987 | Wakfer | Apr. 27, 1915 |
| 1,568,607 | Junkunc | Jan. 5, 1926 |
| 2,238,134 | Schoen | Apr. 15, 1941 |